July 14, 1936.    N. B. GREEN    2,047,263
SHUTTER CONSTRUCTION
Filed Nov. 23, 1935
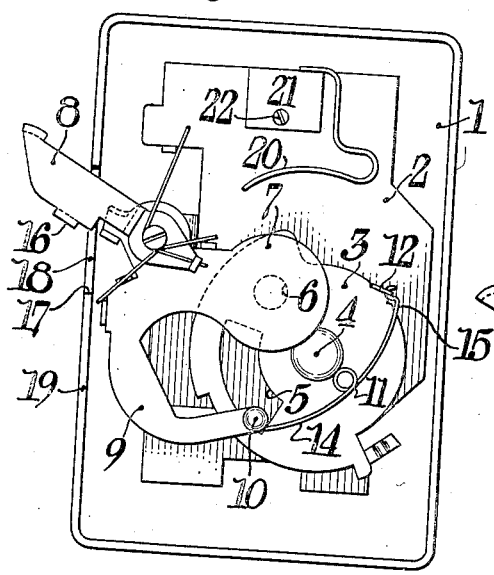
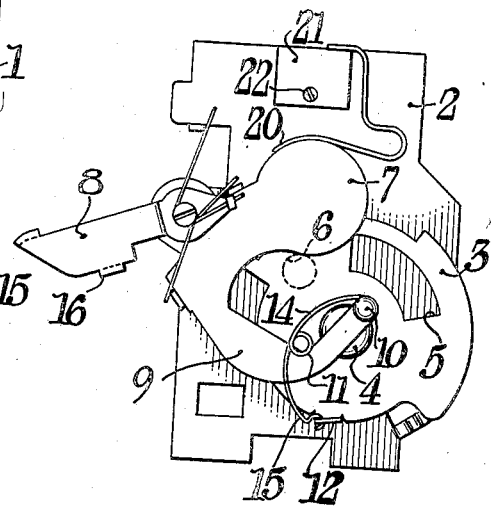
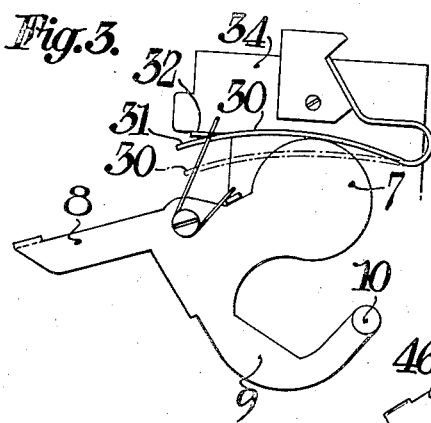
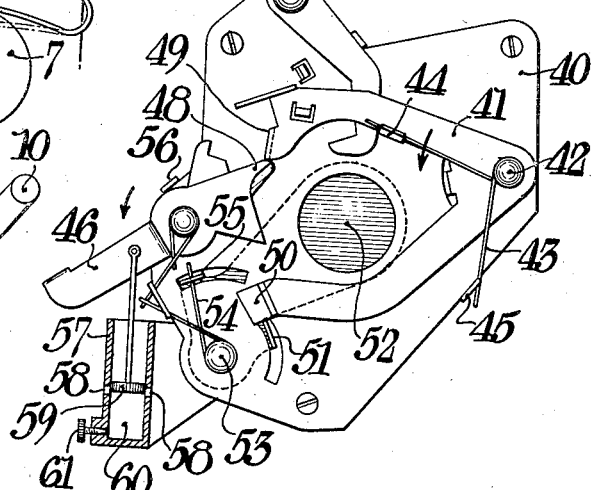
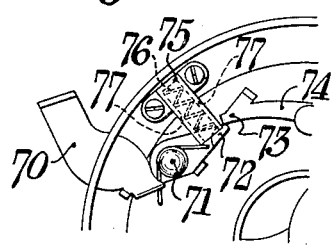
Newton B. Green,
INVENTOR:
BY Newton M. Perrins
Donald H. Stewart
ATTORNEYS.

Patented July 14, 1936

2,047,263

UNITED STATES PATENT OFFICE 2,047,263

SHUTTER CONSTRUCTION

Newton B. Green, Rochester, N. Y., assignor to Eastman Kodak Company, Rochester, N. Y., a corporation of New York Application November 23, 1935, Serial No. 51,276

15 Claims. (Cl. 95—60)

This invention relates to photography, and more particularly to shutters for photographic cameras. One object of my invention is to provide a shutter with a means for reducing or eliminating the jar which frequently occurs during the making of an exposure. Another object is to provide a shutter in which the trigger is prevented from coming suddenly to rest after making an exposure. Another object is to provide a shutter in which a device is incorporated for eliminating the sudden shock which usually occurs in shutters during an exposure. Still another object is to provide a shutter of the automatic type in which the effect of setting and releasing a spring by means of a trigger is minimized, and other objects will appear from the following specification, the novel features being particularly pointed out in the claims at the end thereof.

In cameras there has always been a tendency for the mechanism of the shutter itself to shake or jar the camera as an exposure is being made, this being primarily due; first, to the force exerted on a trigger to tension and release the master member spring and, second, to the trigger suddenly coming to rest against a stop.

In the new small, light-weight cameras any shock or jar is particularly noticeable because the camera is hard to hold steady, and because the negatives are usually enlarged so that defects are usually magnified.

In shutters of the "automatic" type a master member spring is tensioned and released by a trigger. In many cameras the tensioned spring immediately reacts on the trigger. In all "automatic" shutters the trigger must tension the master member spring and release it in travelling through its fixed path. Consequently, the trigger will tend to jump as the master member slips off the trigger, thus making one jar, and the trigger will tend to come to a sudden stop upon reaching the end of its path of movement, thus causing a second jar aggravated by the acceleration due to the slip off. Sometimes the two occur nearly together, and the effect is magnified.

The shutter mechanism does not permit materially lighter springs to be used, so that the force required to set the master member cannot be reduced below an amount necessary for a required shutter speed. Heretofore, efforts to eliminate jar have been made chiefly in trying to make the trigger easier to operate, as by increased mechanical advantage.

In shutters of the "setting" type in which a spring master member is set by a separate lever the liability of jar is greatly reduced, since the only function of the trigger is to release the already set master member. But even in these shutters jar may occur when the trigger is depressed to release the master member, because when the master member is released, the pressure on the trigger may cause it to jump suddenly contacting with a stop, thus vibrating the shutter.

My invention is directed to overcoming vibrations due to the operation of triggers in either "automatic" or "setting" shutters.

I have found that jar can be greatly minimized or entirely eliminated by impeding the shutter trigger through at least a portion of its stroke so as to render the "slip-off" of the master member from the trigger unnoticeable, and/or so as to prevent the trigger from coming suddenly to rest at the end of its path of movement. This impedance can take place at the "slip-off" point or thereabouts, can be made so that the torque on the trigger throughout the setting and releasing is substantially uniform, and can be made to progressively increase as the trigger approaches the end of its path of movement. Thus the "slip-off" will not tend to jar the shutter, and the trigger by coming more gradually to the end of its stroke will not deleteriously shake the shutter by coming too suddenly to rest. This can be accomplished in various ways as will now be more fully described.

Coming now to the drawing wherein like reference characters denote like parts throughout:

Fig. 1 is a front plan view of a camera shutter with the cover removed, including a shock eliminator constructed in accordance with and embodying a preferred form of my invention.

Fig. 2 is a plan view of parts of the shutter mechanism shown in Fig. 1, but in a different position.

Fig. 3 is a fragmentary detail view showing parts of a shutter mechanism constructed in accordance with a second embodiment of my invention.

Fig. 4 is a plan view of parts of a shutter mechanism constructed in accordance with a third embodiment of my invention.

Fig. 5 is a fragmentary detail plan view showing parts of a shutter mechanism constructed in accordance with still another embodiment of my invention.

In accordance with the embodiments shown in Figs. 1 and 2 the shutter may consist of a hollow box-like housing 1 on which there is mounted a plate 2 carrying the assembled shutter mechanism. This may consist of a shutter blade 3 pivotally mounted at 4 to plate 2 and having an aperture 5 through which an exposure is made, as this aperture crosses the lens aperture 6 when the shutter blade is moved in one direction.

When moved in a reverse direction the cover plate 7 which forms a part of the trigger 8 lies over the aperture 6, and consequently an exposure is not made. Thus, by pressing the trigger 8 downwardly through a fixed path of movement, an exposure can be made by means of the arm 9 which is pivotally attached at 10 to a hairpin spring 11, the opposite end of which is attached at 12 to the shutter blade 3. The first portion of the downward movement of the trigger 8 causes the ends 14 and 15 of the hairpin spring 11 to approach each other, thus tensioning the spring. Continued movement of the trigger 8 causes the ends of the spring to pass so as to suddenly release the hairpin spring, effecting a rapid motion of the shutter blade 3 which will occur when the trigger 8 has been moved to the position shown in Fig. 1—that is, to a position in which the cover plate 7 has been removed from the path of light rays passing through the aperture 6.

With a shutter of the type described there are two major causes for shock which have been set out above—that is, the first cause is that as soon as the hairpin spring 11 has been placed under tension and it is released to move the shutter blade 3, the pressure required to move trigger 8 is reduced, and in fact, the spring 11 tends not to resist further movement of the trigger 11 but to accelerate further movement of it. This sudden change in the pressure required to move trigger 8 frequently causes an operator to shake the camera at this point through undue pressure upon the trigger. A second cause for shake is that as the trigger 8 is depressed suddenly due to the pressure on spring 11 being released, a bottom edge of the trigger 16 will strike the edge 17 which is at the end of the slot 18 in the shutter wall 19 through which the trigger passes, thus being suddenly stopped. This is also liable to shake the camera.

In order to avoid these difficulties I have added in the embodiments shown in the first two figures, a shock absorbing spring 20 which may be formed from an edge of a plate 21 which can be attached to the plate 2 in any suitable manner as by a screw 22. This spring is so positioned that as the shutter trigger 8 is depressed, the cover plate 7 will contact with the spring at just about the point where the tension of the spring 11 has been sufficient to cause the shutter blade 3 to turn. From the point of contact with the spring 20 a further downward movement on the trigger 8 will impose a progressively increasing impedance on the trigger so that the pressure required to lower the trigger is progressively increased as the trigger nears the end of its path of movement.

This construction not only prevents the trigger from speeding up as soon as the shutter blade is released, but it likewise prevents the trigger from coming into contact suddenly with a stop as may be formed at 17, as above described. Since the end of the movement of the trigger is cushioned, and the shock of its suddenly coming to rest is absorbed, the two major causes for shutter shake are automatically eliminated.

In Figure 3 I have shown another embodiment of my invention having some advantages over the first type in that as the cover plate 7 of the trigger 8 contacts with the spring member 30, which has a normal position of rest as indicated in the broken lines, and tensions this spring, the end 31 of the spring member 30 may contact with an upstanding lug 32 formed on the plate 34, thus materially increasing the force necessary to lower the trigger 8 beyond the point shown in Fig. 3. This added resistance has the effect of definitely preventing the trigger from striking a stop, such as 17, and materially slowing up or cushioning the last part of the movement of the trigger.

The shutter mechanism shown in the first three figures can conveniently be formed in accordance with the showing of U. S. Patent No. 1,991,146, Carl C. Fuerst, issued February 12, 1935, for Photographic shutter construction.

In Fig. 4 I have shown another embodiment of my invention as applied to a shutter of the type shown in U. S. Patent 1,925,567, Riddell, granted September 5, 1933, for Photographic shutters. In this type of shutter there is a shutter plate 40 having a master member 41 pivoted upon a stud 42 and adapted to be turned in the direction shown by the arrow by a spring 43 encircling the stud 42 and having one end in engagement with a lug 44 on the master member and the other end in engagement with a lug 45 turned up from the plate 40. Thus, the master member is provided with a motive spring which must be set and released each time the trigger 46 is depressed.

When the trigger 46 is moved in the direction shown by the arrow, the end 48 of the trigger engages a flange 49 on the master member, moving it against the pressure of the spring 43 until the slip-off occurs—that is, until member 48 passes beneath the lug 49. At this point the master member 41 under the impulse of spring 43 will rapidly move in the direction shown by the arrow, so that the end 50 of the master member may, by rotating the lug 51, cause the shutter blade 52 to oscillate upon its pivot 53, making an exposure. A spring 54 contacting with a lug 55 on the shutter blade will return the shutter blade to its normal position of rest. In a shutter of this type it is possible to shake the shutter first, at the point of slip-off when the master member leaves the trigger. Second, it is possible to shake the shutter when the trigger comes to rest by striking the upstanding lug 56, this lug being carried by plate 40.

In order to avoid shake at these two points I have provided a dashpot 57 having apertures 58 permitting the free escape of air up to the point in which the piston 59 covers these ports. This should occur as indicated in Fig. 4 when the trigger 46 has about reached the slip-off point with the master member. Thus, if trigger 46 should be compressed beyond the position shown in Fig. 4, the stroke of the trigger would be cushioned or impeded by means of air being compressed in the lower part 60 of the cylinder from which the escape of air can be controlled by a needle valve 61.

In still another embodiment of my invention as shown in Fig. 5, a coiled spring may be used to impede the end of the stroke of the trigger. As shown in this figure the shutter trigger 70 is pivoted at 71 and has a tip 72 adapted to ride under the end 73 of a master member 74, thus tensioning a motor spring and releasing it in a manner usual with such shutters. In this embodiment of my invention I provide an open ended cylinder 75 in which a coiled spring 76 is mounted, this spring being adapted to contact with the tip 72 of the shutter trigger 70. This tip may move freely into the cylinder through a slot 77 provided for that purpose. Thus, the slot will not only guide the end of the trigger 72, but it will also hold the spring 76 in the proper position to be compressed by movement of the trigger.

While I have shown a number of different types of shutter construction which can be employed in utilizing my invention, all of these forms accomplish the same result—that is, they impede or restrict the movement of the trigger through a portion of its travel necessary to actuate a shutter. The portion of the path of movement of the trigger which must be impeded will, of course, vary with shutters of different design, but the impedance should be such that there is no tendency for the trigger to give a sudden jump when the slip-off of the master member from the trigger occurs, or when a spring has been suddenly placed under tension and released. The trigger retarding mechanism should also be arranged so that the trigger will require a much greater force at the extreme end of its stroke than during the major portion of its movement, so that the trigger will be slowed up to such an extent that it will not strike a stop with such force as would shake the shutter.

While I have shown a number of preferred embodiments of my invention, it is obvious that various changes can be made from these without departing from my invention. I consider as within the scope of my invention all such forms as may come within the scope of the appended claims.

What I claim is:

1. In a shutter for photographic cameras, the combination with a master member, of a trigger mounted to move through a fixed path and adapted to engage and move the master member for releasing the shutter, and means for retarding the movement of the trigger during a portion of its movement through its path.

2. In a shutter for photographic cameras, the combination with a master member, of a trigger mounted to move through a fixed path and adapted to engage and move the master member for releasing the shutter, a shock absorber mounted in the path of the trigger and adapted to gradually retard the movement of the trigger toward the end of its path of movement.

3. In a shutter for photographic cameras, the combination with a master member, of a trigger mounted to move through a fixed path and adapted to engage and move the master member for releasing the shutter, a spring mounted in the path of movement of the trigger and adapted to slow up the movement of the trigger toward the end of its path of movement.

4. In a shutter for photographic cameras, the combination with a master member, of a trigger mounted to move through a fixed path and adapted to engage and move the master member for releasing the shutter, a leaf spring mounted in the path of movement of the trigger and adapted to be engaged thereby when the trigger has moved a predetermined distance through its path.

5. In a shutter for photographic cameras, the combination with a master member, of a trigger mounted to swing through a fixed path to tension and release the master member, means in the path of the trigger and included in the camera shutter for absorbing the trigger acceleration due to releasing the master member.

6. In a shutter for photographic cameras, the combination with a master member, of a trigger mounted to swing through a fixed path to tension and release the master member, means in the path of the trigger and included in the camera shutter for absorbing the trigger acceleration due to releasing the master member, said means comprising a spring attached to the shutter and having a free end lying in the path of the shutter trigger and adapted to be engaged and gradually tensioned by the trigger moving through its path.

7. In a shutter for photographic cameras, the combination with a master member, of a trigger mounted to swing through a fixed path to tension and release the master member, a spring lying in the path of the trigger and adapted to be engaged thereby, and means included in the shutter and adapted to be engaged by the spring when flexed by the trigger to increase the resistance of the spring after predetermined movement thereof.

8. In a shutter for photographic cameras, the combination with a master member, of a trigger mounted to swing through a fixed path to tension and release the master member, and a trigger retard carried by the shutter effective to cushion the trigger movement through a predetermined part of its path of movement.

9. In a shutter for photographic cameras, the combination with a master member spring, of a trigger for tensioning and releasing the master member spring, said trigger being adapted to move through a path and to have a release point in said path from which point the trigger may be moved more easily, a trigger retard adapted to impose on the trigger a tension approximately equal to tension on the trigger up to the release point whereby the shutter may be actuated without undue movement.

10. In a photographic shutter, the combination with a master member spring, of a trigger movably mounted on the shutter for exerting a force on the master member spring to tension and release the master member spring, and a trigger retard positioned and arranged to impede the trigger when the master member spring is released.

11. In a photographic shutter, the combination with a master member spring, of a trigger movably mounted on the shutter for exerting a force on the master member spring to tension and release the master member spring, and a trigger retard positioned and arranged to impede the trigger when the master member spring is released, the impeding action of the trigger retard being in the order of force exerted by the trigger in tensioning the master member spring.

12. In a photographic shutter, the combination with a master member spring, of a trigger movably mounted on the shutter for exerting a force on the master member spring to tension and release the master member spring, and a trigger retard position and arranged to impede the trigger when the master member spring is released, the impeding action of the trigger retard being in the order of force exerted by the trigger in tensioning the master member spring, and means for rendering the trigger retard effective when the master member spring is released.

13. In a photographic shutter, the combination with a master member spring, of a trigger movably mounted on the shutter for exerting a force on the master member spring to tension and release the master member spring, and means included in the shutter and cooperating with the master member for tensioning the trigger when the master member spring is released.

14. In a photographic shutter, the combination with a master member, of a trigger adapted to tension and release said master member, and means included in the shutter adapted to apply a progressively increasing impedance to the trigger as it is moved to set and release the master member.

15. In a photographic shutter, the combination with a master member, of a trigger adapted to tension and release said master member, and a stopping device included in the shutter adapted to engage the trigger member and move with said trigger applying a progressively increasing impedance thereto as said trigger is moved to actuate the shutter.

NEWTON B. GREEN.